United States Patent [19]

Sayer

[11] 4,092,934
[45] June 6, 1978

[54] APPARATUS FOR USE IN DEPOSITING ARTICLES IN A RECEPTACLE AND A SEQUENCE CONTROLLER UTILIZED THEREIN

[75] Inventor: Trevor Anthony Sayer, Croydon, England

[73] Assignee: Burroughs Corporation, Detroit, Mich.

[21] Appl. No.: 527,897

[22] Filed: Nov. 27, 1974

[30] Foreign Application Priority Data

Mar. 15, 1974 United Kingdom ............... 11611/74

[51] Int. Cl.² .............................................. G07G 5/00
[52] U.S. Cl. ..................................... 109/24.1; 346/22
[58] Field of Search .................. 109/24.1, 66; 232/44; 346/22

[56] References Cited

U.S. PATENT DOCUMENTS

| | | | |
|---|---|---|---|
| 3,042,919 | 7/1962 | Simjian | 346/22 |
| 3,836,980 | 9/1974 | Grosswiller et al. | 109/24.1 |
| 3,866,235 | 2/1975 | Maynard et al. | 109/24.1 |

*Primary Examiner*—Paul R. Gilliam
*Assistant Examiner*—David H. Corbin
*Attorney, Agent, or Firm*—Benjamin J. Barish; Robert J. Gaybrick; Kevin R. Peterson

[57] ABSTRACT

Apparatus is described for use in depositing bank deposit envelopes in a receptacle according to an enforced sequence of actions in a deposit cycle, each action having to take place within specified time periods. The apparatus includes error testing means terminating the deposit cycle at any stage thereof in which an action occurs deviating from the predetermined sequence or not within a time period specified in the sequence. The sequence controller includes a shift register having an output for each stage in the cycle, a logical gate for each stage which gate is enabled by a signal from the shift-register output of the preceding stage, and clocking means responsive to the output signals from the logical gates for clocking the shift-register.

11 Claims, 5 Drawing Figures

APPARATUS FOR USE IN DEPOSITING ARTICLES IN A RECEPTACLE AND A SEQUENCE CONTROLLER UTILIZED THEREIN

BACKGROUND OF THE INVENTION

The present invention relates to apparatus for use in depositing articles in a receptacle, and also to a sequence controller utilized in such apparatus. The invention is particularly useful with respect to an apparatus enabling the deposit of envelopes in a bank in a tellerless manner, and is therefore described below with respect to such an application.

Under modern banking practices, there is a tendency to enable more and more transactions to be made in a tellerless manner. Thus, apparatus has been devised enabling the customer to withdraw a limited amount of funds from a bank at any time, even when the bank is closed, by the use of an individual machine-readable card. Apparatus has also been provided enabling the customer to make bank deposits when the bank is closed.

BRIEF SUMMARY OF THE INVENTION

The present invention provides an improved apparatus which may be used for depositing articles, particularly bank deposit envelopes, in a receptacle. Briefly, the apparatus comprises: a chute having an inlet through which the articles are inserted and an outlet through which the articles exit into the receptacle; a mechanical gate at the inlet of the chute; a mechanical gate at the outlet of the chute; an actuator for each of the inlet and outlet gates for opening and closing same; a recording device within the chute for recording information on the article therein; an actuator for actuating the recording device; cycle initiating means enabling when the inlet gate is closed for initiating a deposit cycle having a predetermined sequence of actions including opening the inlet gate to permit insertion of the article into the chute while the outlet gate is closed, closing the inlet gate, actuating the recording device to record information on the article, and opening the outlet gate to permit the article to pass into the receptacle; a sequence controller controlling the actuators of the inlet gate, the recording device, and the outlet gate to enforce said predetermined sequence of actions in the deposit cycle within specified time periods; and error detecting means terminating the deposit cycle at any stage thereof in which there occurs an action deviating from said predetermined sequence or not within a time period specified in the sequence.

More particularly, the sequence controller comprises: a plurality of sensors sensing a plurality of events occurring asynchronously and producing actuating signals in response thereto; and a sequencing circuit including means establishing a plurality of stages according to a predetermined sequence in which the events are to occur in the deposit cycle. The sequencing circuit further includes control means responsive to the sensor actuating signal in its respective stage for actuating the respective actuator and for advancing the sequential controller to the next stage of the deposit cycle.

The sensors, in the embodiment described below, comprise: an inlet gate sensor sensing the condition of the inlet gate; a chute sensor sensing the condition of whether or not an article is in the chute; a printer sensor sensing the condition of the printer; and an outlet gate sensor sensing the condition of the outlet gate.

The invention also provides a sequence controller, particularly useful in the above apparatus, for controlling a plurality of devices in accordance with a cycle having a predetermined sequence of actions and in response to a plurality of events occurring asynchronously. Briefly the sequence controller comprises means initiating the cycle; a plurality of sensors sensing the plurality of events and producing actuating signals in response thereto; and a sequencing circuit including means establishing a plurality of stages according to the predetermined sequence in which the events are to occur and controlling said device in response to the sensor actuating signal in its respective stage. The sequencing circuit includes a shift register having an input and parallel outputs one for each stage, and a logical gate for each stage. Each logical gate produces a predetermined output signal upon receiving an enabling signal from the shift register output of the preceding stage in coincidence with an actuating signal from the sensor of its respective stage. The apparatus further includes means feeding a signal to the input of the shift register; clocking means responsive to said predetermined output signal from each of the logical gates for clocking the shift register to shift its input signal from one output to the next in succession; and means responsive to the output signals from the shift register for controlling the actuators.

According to a further feature, the clocking means comprises a flip-flop receiving the output signals from all the logical gates at one of its input terminals, and the inversion thereof at the other of its input terminals; means clocking the flip-flop; and means feeding the signals from one output terminal of the flip-flop to the clock input of the shift register for clocking same.

Further features and advantages of the invention will be apparent from the description below.

BRIEF DESCRIPTION OF THE DRAWINGS

The invention is herein described, by way of example only, with reference to a tellerless bank depositing apparatus illustrated in the accompanying drawings, wherein.

DESCRIPTION OF THE PREFERRED EMBODIMENT

General Arrangement

Figure 1:
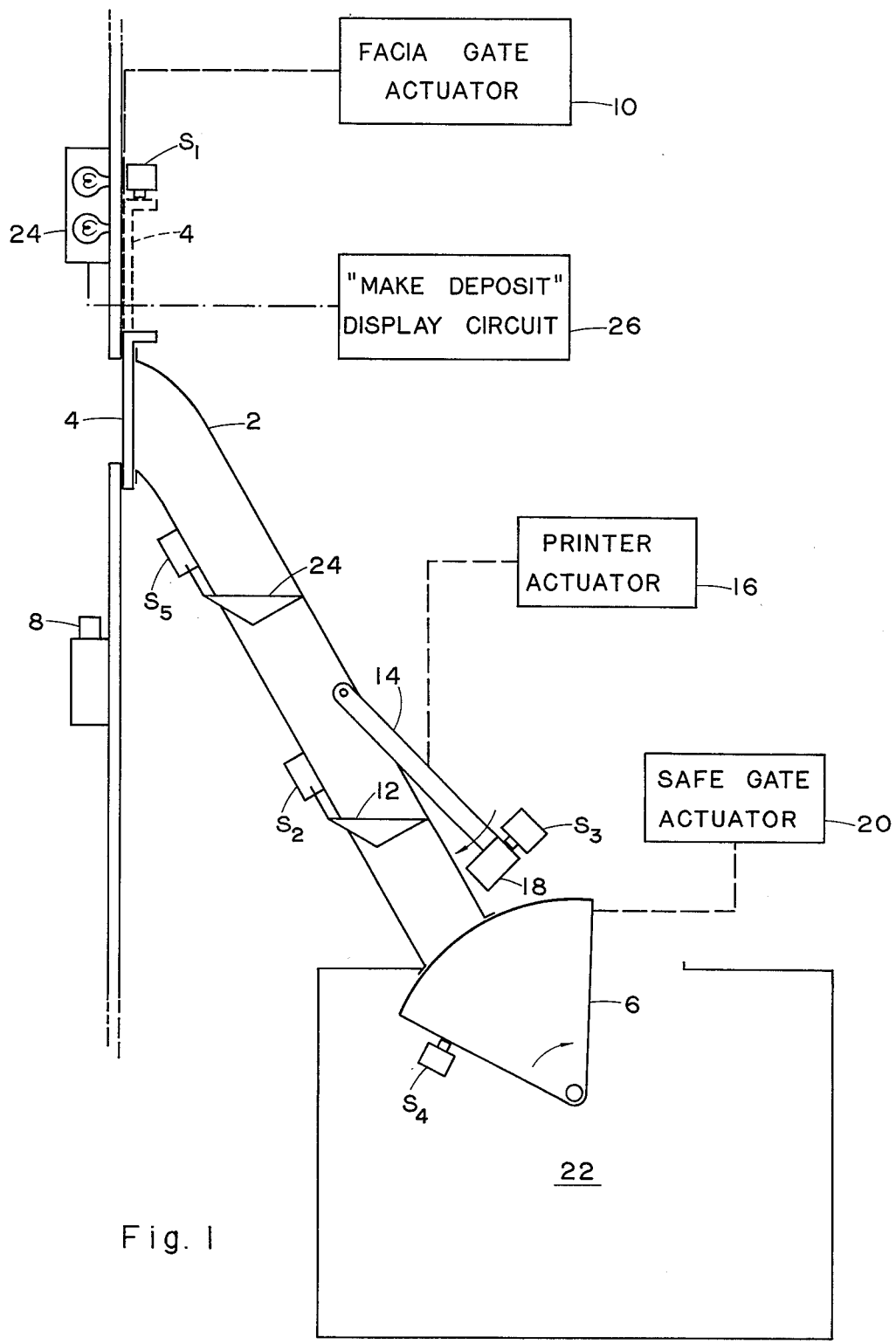
FIG. 1 schematically illustrates the deposit chute in which the bank deposits are made, including the various actuator and sensor devices associated with the chute.

The apparatus illustrated in the drawings is one for use in making bank deposits in a tellerless manner. Briefly, the customer depresses a Deposit key which opens the deposit gate (i.e. a mechanical gate at the inlet of the deposit chute) in the teller's fascia and also initiates a deposit cycle involving the execution of a predetermined sequence of actions within specified time periods. The first action is the insertion of the bank deposit envelope through the slot in the fascia opened by the inlet gate, which envelope falls down the chute until it comes up against the closed safe gate at the outlet end of the chute. When the envelope reaches this position, a chute sensor is activated which causes a printer to print a transaction number on the envelope. Once this is completed, the safe gate at the outlet end of the chute is opened, which allows the envelope to fall into the deposit safe. The safe gate is then closed, thereby completing the deposit cycle.

Sensors are provided to sense the events or conditions which must be fulfilled before the apparatus can progress to the next stage of the deposit cycle. If any of these required conditions or events does not occur in the proper stage of the cycle, or within a predetermined time period specified in the cycle, the deposit cycle is not completed and the apparatus is reset to its normal or starting condition.

The apparatus illustrated in the drawings uses a logic arrangement, which, on receipt of a "start" control command signal (from the processor upon the depression of the "Deposit" key), drives the apparatus through the complete deposit cycle without further firmware action. On completion of the cycle, the logic is in its normal or starting condition preparatory for a new deposit cycle.

The portion of the apparatus used in the foregoing deposit cycle is diagrammatically illustrated in FIG. 1. It includes a chute 2 having a gate 4 at the inlet thereof, and another gate 6 at the outlet end thereof. At the beginning of the deposit cycle, both of these gates are closed. The deposit cycle is initiated by the processor (not shown) when the customer depresses the "Deposit" key, diagrammatically illustrated at 8, whereupon the inlet or fascia gate 4 opens to permit insertion of the bank deposit envelope into chute 2.

The inlet or fascia gate 4 is opened by an actuator 10, such as a solenoid, and its condition is sensed by a sensor $S_1$, the latter being a normally open switch which closes when the fascia gate is not fully closed.

After the bank deposit envelope is inserted through the open fascia gate into chute 2, it travels downwardly by gravity to the bottom of the chute until it comes against the outlet gate 6. As the envelope arrives to this position, it actuates a chute sensor $S_2$. The latter may be a micro-switch having a feeler arm 12 disposed in the chute to be engaged by the descending envelope.

At this stage, a printer 14 is actuated by an actuator diagrammatically illustrated by block 16. Actuator 16 cycles printer 14 so as to bring the latter's printing head 18 into engagement with the envelope at the bottom of the chute, and then to return the printing head to its normal condition. The printing head 18 applies a transaction number to the envelope, and therefore is of the type which is automatically incremented one unit with each actuation thereof.

The actuation of the printer is sensed by a printer sensor $S_3$. The latter is another switch which is normally closed when the printer is in its normal, non-actuated condition, but is opened during the actuation of the printer.

After the printer has been actuated and returned, outlet or safe gate 6 is opened by an actuator 20, such as a solenoid, to permit the envelope to fall into the receptacle or safe 22, whereupon the gate is automatically closed. The condition of the gate is sensed by a gate sensor $S_4$, in the form of a switch which is normally open but is closed whenever the gate is not in its completely closed condition.

The apparatus illustrated in FIG. 1 further includes a jam sensor $S_5$ in the form of another normally-closed switch having a feeler arm 24 disposed within chute 2 above feeler arm 12 of sensor $S_2$. Feeler arm 24 of sensor $S_5$ should be at a height below fascia gate 6 which is less than the length of the shortest envelope normally to be accommodated by the apparatus, so that if the envelope becomes jammed within the chute and does not reach the bottom gate 6, this will be sensed by sensor switch $S_5$ being in its open condition.

In addition, the apparatus includes an indicator 24 viewable to the user, the indicator carrying a "Make Deposit" display. This display is controlled by a circuit 26 so as to be illuminated when fascia gate is opened (thereby directing the user to place the bank envelope into the chute) and is extinguished as soon as the fascia gate is closed.

In the described embodiment, the deposit cycle can be initiated only when both gates 4 and 6 are closed. Briefly, the deposit cycle is initiated by depressing the Deposit key 8, whereupon the fascia gate 4 is opened to permit insertion of the bank envelope into chute 2, and the "Make Deposit" display 24 is illuminated. The inserted envelope falls down through the chute whereupon it actuates and then deactuates jam sensor $S_5$, and then actuates chute sensor $S_2$. The latter sensor remains in its actuated condition when the envelope reaches the safe gate 6 at the bottom of the chute. At this point, fascia gate 4 is closed, and the "Make Deposit" display 24 is extinguished. After a predetermined time (in this case 1.25 seconds) to permit the fascia gate to close fully and the envelope to settle at the bottom of the chute, printer 14 is actuated to apply the transaction number to the envelope, and upon return of the printer to its normal position as sensed by sensor $S_3$, safe gate 6 is opened to permit the envelope to fall into the safe receptacle 22. After a predetermined time delay (in this case 2.5 seconds) the safe gate 6 is closed, and upon sensor $S_4$ sensing the closed condition of the gate, the apparatus is normalized in preparation for a new deposit cycle.

Figure 2:
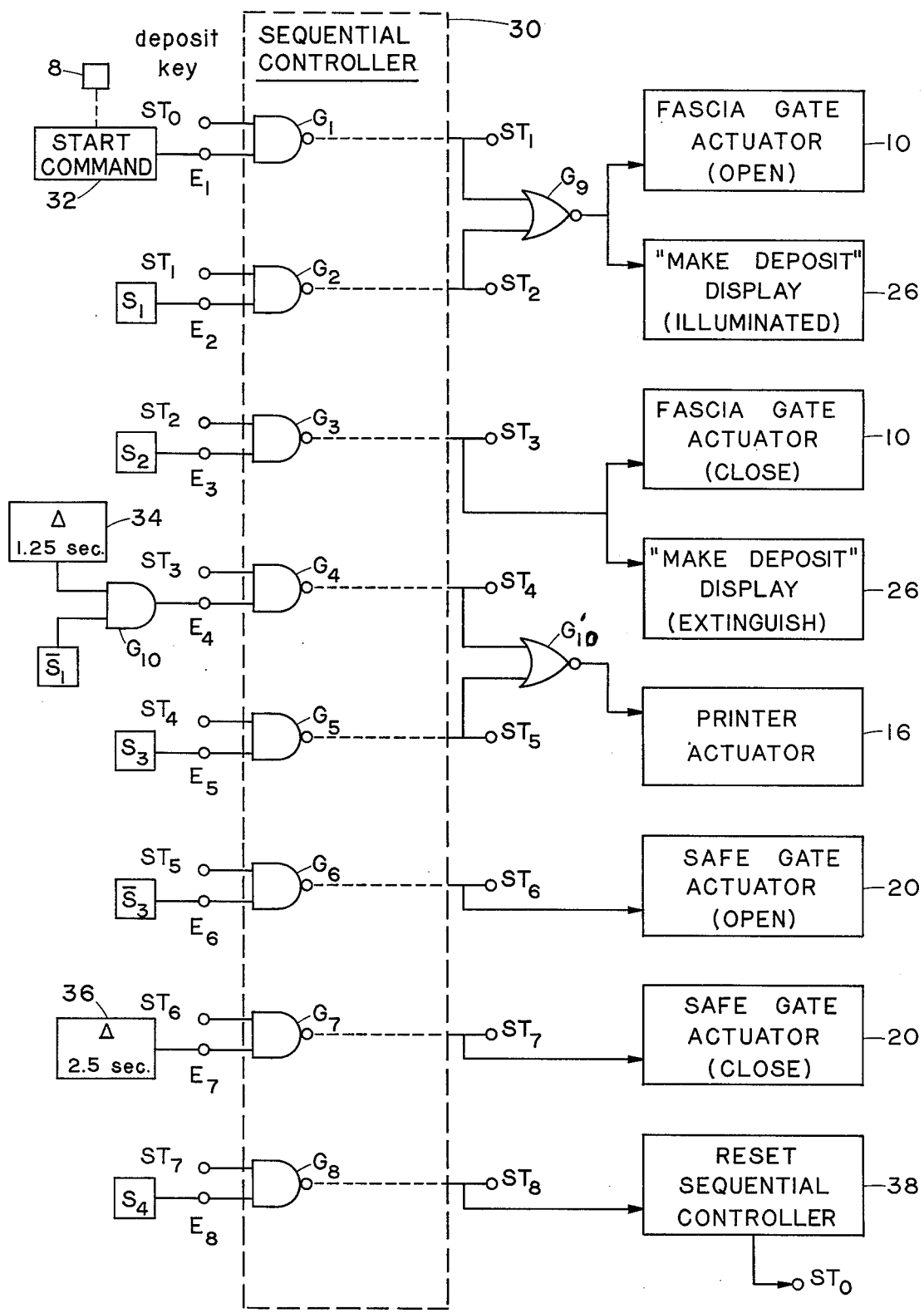
FIG. 2 is a block diagram illustrating the overall arrangement and mode of operation of the apparatus.

FIG. 2 illustrates in block diagram form the overall circuit arrangement of the apparatus of FIG. 1 for performing the above sequence of actions in a deposit cycle. Briefly, the circuit includes a sequence controller, generally designated 30, which controls the fascia gate actuator 10, the printer actuator 16, the safe gate actuator 20, and the display circuit 26, to enforce the above sequence of actions and within specified time periods. A specific sequential controller which may be used is more particularly illustrated in FIG. 3, and its operation is more particularly described with reference to FIG. 4.

The apparatus also includes an error detecting arrangement terminating the deposit cycle at any stage thereof in which there occurs an action deviating from the predetermined sequence, or not within a time period specified in the sequence. An error detecting arrangement which may be used is shown in block diagram in FIG. 5.

Overall Logic Control (FIG. 2)

Referring back to the overall system illustrated in FIG. 2, it will be appreciated that the various events and conditions which control the sequence of actions in a deposit cycle, and which are sensed by the sensors $S_1$–$S_5$, occur asynchronously. Sequential controller 30, illustrated in block form in FIG. 2, establishes a plurality of stages according to the predetermined sequence in which the events are to occur in the deposit cycle, and responds to the output signals from the sensors in their respective stages for actuating the respective actuator controlled by that sensor. As each actuator is actuated in its respective stage, the sequential controller 30 advances the system to the next stage of the deposit cycle to await the next asynchronously occurring event which actuates the actuator in that next stage.

Figure 3:
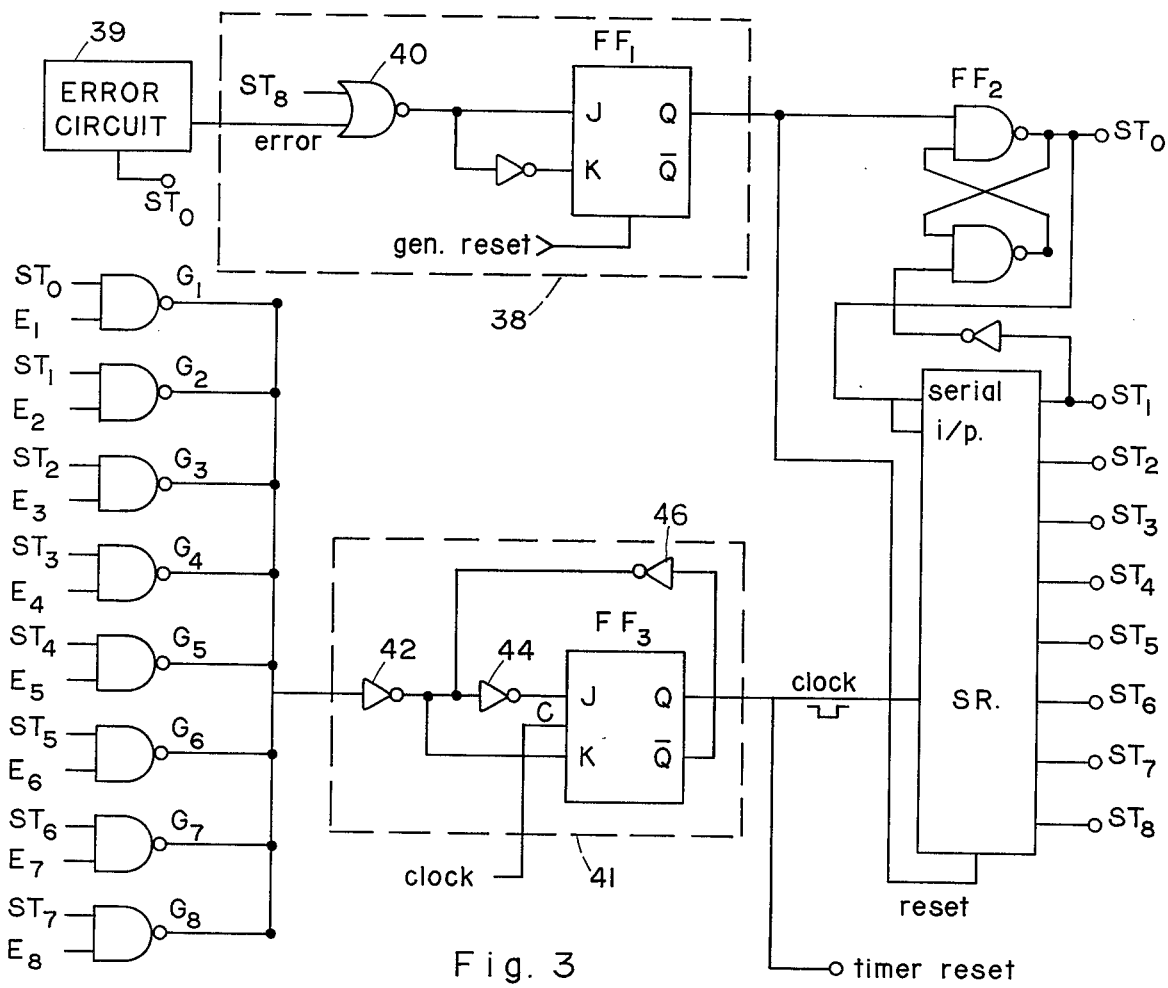
FIG. 3 illustrates a particular sequential controller used in the apparatus.

A preferred form of sequential controller which may be used is illustrated in FIG. 3 and is described more particularly below.

For purposes of describing the overall system as illustrated in FIG. 2, it is sufficient at this point to note that the sequential controller includes a plurality of logic gates $G_1$–$G_8$, one for each of the stages. All these gates are illustrated an NAND-gates having two inputs, namely a "stage" input "ST" and an "event" input "E". The stage input "ST" receives a signal from the preceding stage output of the sequential controller to enable the gate for operation when it receives its asynchronous event input "E". Thus, the gate is enabled to actuate its respective actuator upon receipt of the asynchronously occurring event signal from the respective sensor, or from another event-determining means such as the run-out of a predetermined time period.

The first stage logical gate $G_1$ is enabled by the receipt of the stage input "$ST_0$" signal upon the completion of the previous deposit cycle, so that it will be ready to start the deposit cycle as soon as the Deposit key 8 is depressed. In this initial or starting condition, all the actuators are deenergized, both the fascia gate 4 and the safe gate 6 are closed, the "Make Deposit" display 24 is extinguished, and the printer 14 is in its inoperative position, as illustrated in FIG. 1.

When the user desires to make a bank deposit, he depresses Deposit key 8, which causes a Start Command circuit 32 to produce a signal $E_1$ on the event input of gate $G_1$. As soon as this occurs, sequential controller 30 produces an output signal via OR-gate $G_9$ to fascia gate actuator 10 to open the fascia gate 4, and a further signal to circuit 26 to illuminate the "Make Deposit" display 24.

Further, sequential controller 30 produces an output signal $ST_1$ which is applied to the $ST_1$ input of the second stage logical gate $G_2$, which thereby advances the apparatus to the second stage of the deposit cycle so that it will be ready to act as soon as it receives the command signal from the sensor of that stage.

Thus, during the first stage, fascia gate 4 is opened, the "Make Deposit" display 24 is illuminated, and logical $G_2$ for the second stage is enabled.

As soon as fascia gate 4 partially opens, its sensor $S_1$ is actuated. This produces a signal $E_2$ to gate $G_2$ which, having been enabled by the enabling signal $ST_1$, produces an output signal via OR-gate $G_9$ to fascia gate actuator 10 causing fascia gate 4 to remain open, and another signal to circuit 26 causing the "Make Deposit" display 24 to remain illuminated. In addition, sequential controller 30 produces an output signal $ST_2$ which is applied to gate $G_3$ to enable the third-stage operation in the deposit cycle.

Thus, during this second stage, initiated by sensor $S_1$ upon the opening of fascia gate 4, the fascia gate remains open, the "Make Deposit" display remains illuminated, and the sequential controller is advanced to enable the next stage of the deposit cycle.

The user may then insert the deposit envelope into chute 2 through the open fascia gate 4. The envelope drops through the chute, first actuating feeler 24 of jam sensor $S_5$ and then feeler 12 of chute sensor $S_2$, until it reaches the bottom of the chute where it is blocked from exiting into the safe 22 by the closed safe gate 6. Assuming the envelope properly reaches the bottom of the chute, jam sensor $S_5$ is in its deactuated condition, whereas chute sensor $S_2$ is in its actuated condition.

The third stage of the deposit cycle is initiated by chute sensor $S_2$. Its detection of the arrival of the deposit envelope to the bottom of the chute assures that the envelope has cleared the fascia gate. As soon as sensor $S_2$ is actuated, it produces signal $E_3$ to gate $G_3$, whereby the sequential controller 30 produces an output signal to actuator 10 to close fascia gate 4, and also to circuit 26 to extinguish the "Make Deposit" dispaly 24. At the same time, the sequential controller produces an output $ST_3$ which is applied to the fourth stage gate $G_4$ to enable that gate to act upon the occurrence of the relevant event or condition of that respective stage.

The fourth stage gate $G_4$ acts as soon as two conditions have occurred, namely, (1) fascia gate 4 has moved into its completely closed position, and (2) a specified time period (in this case 1.25 seconds) has run out, to allow the fascia gate 4 to completely close and the deposit envelope to settle in the bottom of the chute.

The latter condition is implemented by a timer circuit 34 applying a signal to one input of an AND-gate $G_{10}$, and the former condition is determined by the absence of a signal from sensor $S_1$, also applied to AND-gate $G_{10}$. The output of AND-gate $G_{10}$ is signal $E_4$ applied to NAND-gate $G_4$ which, in coincidence with the enabling signal $ST_3$ from the preceding stage, initiates the fourth stage of the deposit cycle.

In the fourth stage the sequential controller 30 produces an output which is applied via NOR-gate $G_{11}$ to printer actuator 16 to actuate printer 14. The printer is thus actuated to cause its printing head 18 to apply a transaction number to the deposit envelope at the bottom of the chute, the printer then returning to its normal position. As indicated earlier, the printer is one that is automatically incremented with each operation so that sequential transaction numbers are applied to the deposit bank envelopes.

The fourth stage of sequential controller 30 also produces an output signal $ST_4$ which is applied to the fifth stage $G_5$ to enable the fifth stage operation in the deposit cycle.

The fifth stage is initiated by signal $E_5$ from printer sensor $S_3$ while the printer is in operation, the sequential controller producing an output signal $ST_5$ applied via OR-gate $G_{11}$ to printer actuator 16 to maintain the actuating of the printing.

The sixth stage is enabled by signal $ST_5$ and is initiated as soon as the printer 14 has completed its cycle and has returned to its normal condition. When this occurs, the signal from printer sensor $S_3$ ceases, the lack of a signal from sensor $S_3$ being input signal $E_6$ to logic gate $G_6$ to initiate the sixth stage of the deposit cycle. During this sixth stage, safe gate actuator 20 is actuated to open safe gate 6, and in addition an output signal $ST_6$ is fed to logic gate $G_7$ of the seventh stage in the deposit cycle.

The seventh stage is initiated upon the elapse of a specified time period (in this case 2.5 seconds) to permit the envelope to drop into the safe 22 after the safe gate has been opened. After the elapse of this time period, as implemented by timer 36 producing signal $E_7$ to gate $G_7$, the sequential controller 30 produces an output signal $ST_7$ applied to safe gate actuator 20 to close gate 6, and also to enable the eighth stage of the deposit cycle.

The eighth stage is initiated when safe gate sensor $S_4$ senses the condition that the safe gate 6 has been closed, thereby producing a signal $E_8$ applied to logic gate $G_8$. When this occurs, sequential controller 30 produces an output signal $ST_8$ which is applied to a circuit 38 for resetting the sequential controller and for producing the enabling signal $ST_0$ applied to the first stage electonic gate $G_1$.

The deposit cycle is thus completed, and the first-stage gate $G_1$ is enabled by signal $ST_0$ in preparation for the execution of another deposit cycle. The next cycle is initiated by another depression of the Deposit key 8.

Figure 4:
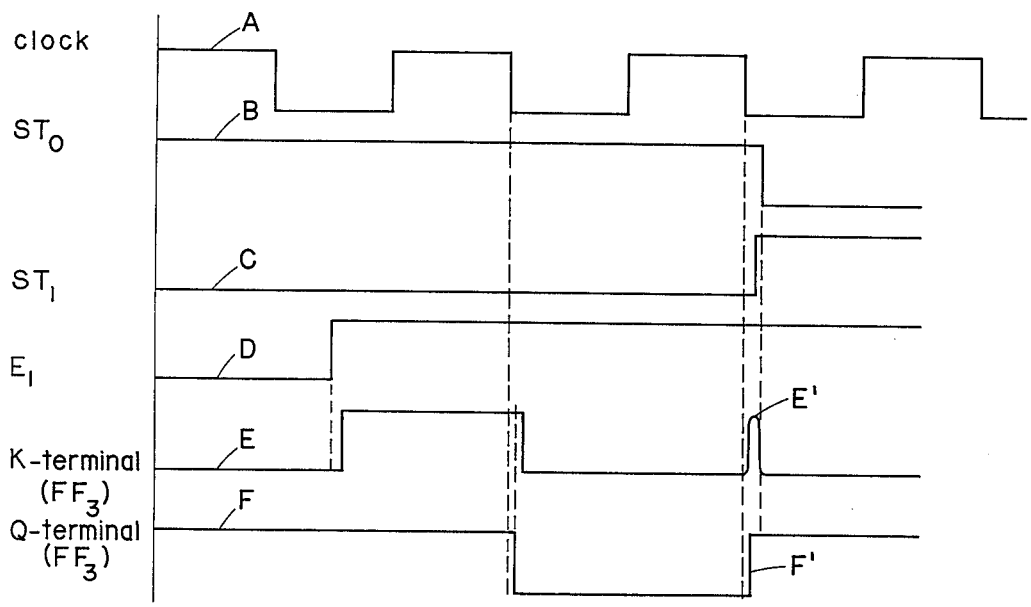
FIG. 4 is a timing diagram relating to the sequential controller of FIG. 3, illustrating the state changes from the normal or initial stage of the deposit cycle to the first stage thereof.

Sequential Controller (FIGS. 3 and 4)

An improved sequential controller that may be used is illustrated in FIG. 3, and its operation will be better understood by the timing diagram of FIG. 4.

The sequential controller 30 illustrated in FIG. 3 includes as MSI 8-bit shift register SR having serial inputs and parallel outputs, there being one output stage for each cycle stage of the sequential controller. Thus, the outputs of the shift-register are labelled $ST_1$–$ST_8$, and correspond to the identically numbered output terminals $ST_1$–$ST_8$ of the sequential controller 30 in FIG. 2.

The shifter-register SR is automatically reset at the completion of each deposit cycle. For this purpose, the signal appearing on the last output terminal $ST_8$ of the shift-register is applied to resetting circuit 38 consisting of a JK flip-flop $FF_1$, the output of which circuit is fed to the reset terminal of the shift-register.

The shift-register may also be reset before the completion of the deposit cycle, e.g. by an error condition. The latter reset signal is derived from circuit 39 (e.g. the error circuit described below) and is likewise fed, via NOR-gate 40 and flip-flop $FF_1$, to the reset terminal of the shift-register.

The above signals used to reset the shift-register SR, and thereby the sequential controller 30, are also applied to the "set" terminal of a flip-flop $FF_2$. The latter, in its set state, produces the $ST_0$ signal applied to the first-stage logical gate $G_1$ for enabling that gate, and thereby for placing the apparatus in condition for executing a deposit cycle as soon as the cycle is initiated by depressing the Deposit key 8, as discussed above.

When flip-flop $FF_2$ is set, the output signal $ST_0$ is also applied to the serial input of shift-register SR.

Thus, in the starting or normal condition of the circuit, the signal on input terminal $ST_0$ of the first-stage logical gate $G_1$ is "true" thereby enabling that gate, whereas the signals on the input terminals $ST_1$–$ST_7$ of logical gates $G_1$–$G_7$ are "false" thereby disabling these gates. Also, flip-flop $FF_2$ is in its "set" condition, and all the outputs of shift-register SR are in their "reset" condition. In addition, the signals on the "events" input terminals $E_1$–$E_8$ of all the logical gates $G_1$–$G_8$ are "false".

The circuit remains in this state until event $E_1$ occurs, namely the depression of Deposit key 8 to initiate a deposit cycle. When this occurs, an output signal is produced from logical gate $G_1$ which is fed to a clocking circuit 41 (described below) for the shift-register, to shift the input signal to its output line $ST_1$, and thereby to produce output signal $ST_1$. The latter initiates the first-stage operation of the deposit cycle as described above, and also enables the second-stage logical gate $G_2$.

The circuit now is ready for the second-stage event, namely the sensing by sensor $S_1$ of the open condition of the fascia gate 4.

The clocking circuit 41, receiving the output signal from logical gate $G_1$ in order to clock the shift-register SR, includes a further flip-flop $FF_3$ of the JK-type. The output signals from all the logical gates $G_1$–$G_8$ are fed via inverter 42 to the K-terminal of the flip-flop, and then through a second inverter 44 to the J-terminal of the flip-flop. The Q-output terminal of the flip-flop is connected to the clock terminal of shift-register SR, whereas the complementary $\overline{Q}$-output terminal is connected via inverter 46 to the K-input terminal of the flip-flop.

FIG. 4 illustrates the timing diagram of the state change from the $ST_0$ state of the shift-register to the next state $ST_1$. Signal A represents the clock applied to flip-flop $FF_3$; signal B represents the $ST_0$ signal which as noted above is "true" in the normal or starting condition of the apparatus, i.e. in the reset state of shift-register SR; signal C represents the $ST_1$ signal which is "false" in the normal condition of the apparatus; signal D represents the $E_1$ signal applied to the first-stage logical gate $G_1$ to initiate the first stage of the deposit cycle; signal E represents the signal appearing at the K-input terminal of flip-flop $FF_3$; and signal F represents the signal appearing at the Q-output terminal of flip-flop $FF_3$.

It will be seen from the timing diagram of FIG. 4 that the occurrence of event $E_1$ (namely the sensing of the open condition of fascia gate 4 by sensor $S_1$) causes the $E_1$ signal D to go "true", and (a short time thereafter owing to the delay of inverter 42) causes the signal E applied to the K-input terminal of flip-flop $FF_3$ also to go "true". The Q-output signal F of flip-flop $FF_3$, which originally was "true", does not change until the falling edge of the next clock pulse A, at which time it, as well as signal E, both go "false". At the falling edge of the next clock pulse A, signal F goes "true", and its rising edge F' clocks the shift-register ST to shift the signal to its output terminal $ST_1$, whereupon signal C ($ST_1$) goes "true" and signal B ($ST_o$) goes "false".

At the time the shift-register SR is clocked, a spike E' may appear with respect to signal E, but this spike would be ineffective since the clock signal A is "false" at that time and therefore flip-flop $FF_3$ is inhibited.

As soon as the first stage has been initiated by signal $E_1$, the first-stage gate $G_1$ is disabled by the $ST_1$ pulse applied from output line $ST_1$ of the shift-register to flip-flop $FF_2$, which resets the flip-flop and thereby makes the $ST_o$ output "false". Thus, as soon as the cycle has been initiated and the second-stage logical gate $G_2$ enabled, the first-stage logical gate $G_1$ is disabled so that any subsequent depression of the Deposit key 8 will be ineffective.

The second stage of the deposit cycle is initiated as soon as the fascia gate 4 partially opens, this being sensed by sensor $S_1$ which produces the $E_2$ signal applied to the second-stage logical gate $G_2$. The latter gate, previously enabled by the $ST_1$ signal from the shift-register, produces an output signal which is applied to the clocking circuit 41 for the shift-register to shift the input signal therein to the next output line, namely output $ST_2$. This initiates the second stage of the deposit cycle described above and also enables the third-stage logical gate $G_3$.

The outputs from the other logical gates $G_3$–$G_8$ are applied in the same manner to the clocking circuit 41 for clocking the shift-register to shift its input signal from one output to the next in succession, thereby initiating the operation of that stage in the deposit cycle and enabling the logical gate for the next succeeding stage.

Error Detecting Arrangement

Figure 5:
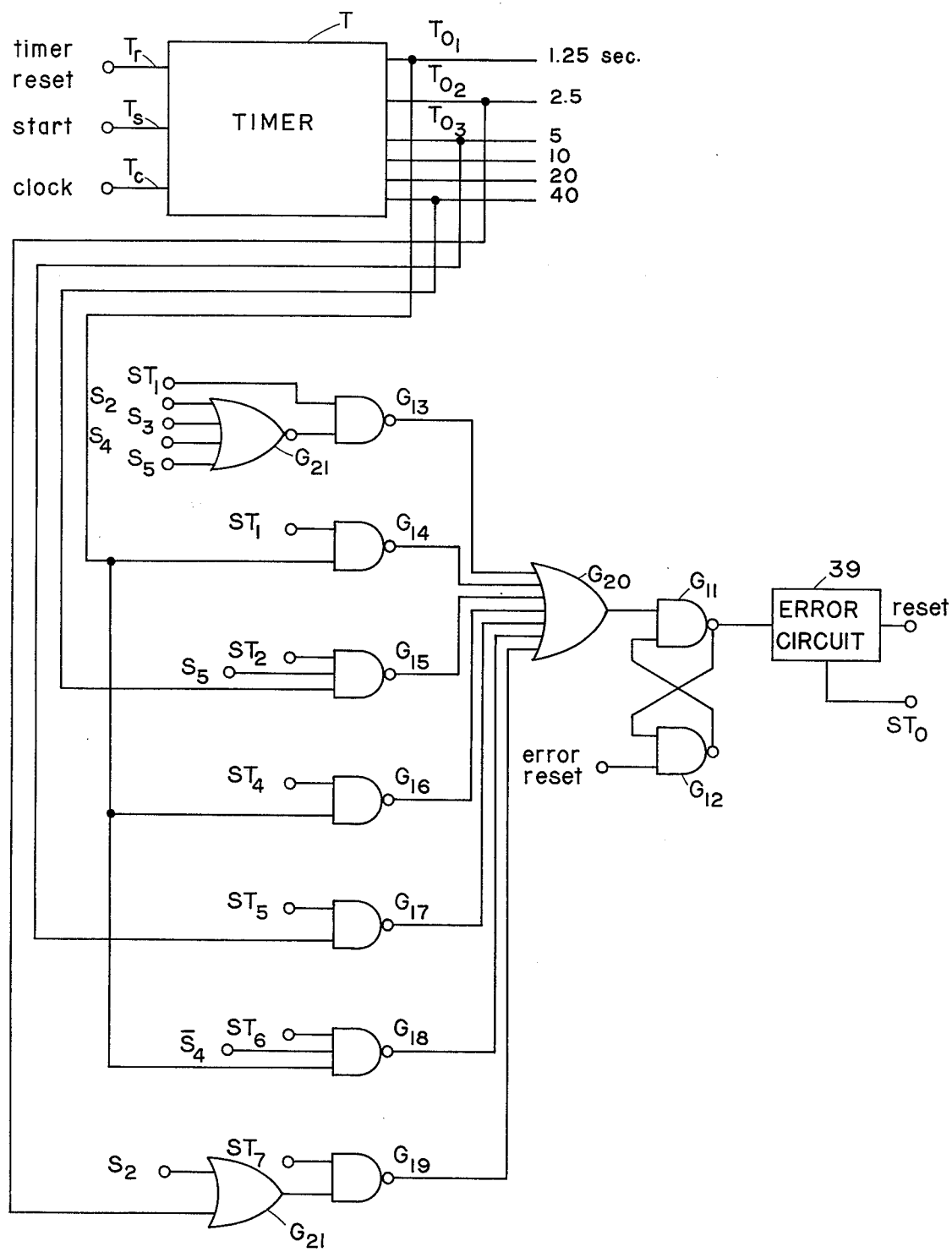
FIG. 5 is a block diagram illustrating the error detector system used in the apparatus.

FIG. 5 illustrates the error detecting arrangement which terminates the deposit cycle at any stage thereof in which there occurs an action deviating from the predetermined sequence of the deposit cycle, or not within a time period specified in the sequence.

Thus, as shown in FIG. 5, the apparatus includes a timer T having an input terminal $Ts$ for starting the timing operation, a second input terminal $Tr$ for resetting the timer which is done at the start of each new stage, and a further input terminal $Tc$ for clocking the timer. The timer includes a plurality of output terminals according to the different time periods that may be utilized in the deposit cycle. Thus, one output terminal $To_1$ receives an output signal after the elapse of 1.25 seconds, a second output terminal $To_2$ receives a signal after the elapse of 2.5 seconds, a third output terminal $To_3$ receives a signal after the elapse of 5 seconds, and so forth, there being as many terminals as timer periods desired.

The error detecting arrangement illustrated in FIG. 5 sets up a number of error conditions any one of which will actuate an error flip-flop including two cross-connected NAND-gates $G_{11}$, $G_{12}$. For each of the error conditions, there is provided a logical gate $G_{13}$–$G_{19}$ the outputs of which are fed via an OR-gate $G_{20}$ to the error flip-flop gates $G_{11}$, $G_{12}$. When the error flip-flop is actuated by one of the foregoing signals, it produces an error signal via circuit 39 which may be used to control an indicator or the like. This error signal is also applied to the Reser circuit (FIG. 3) of the shift-register to reset it and thereby to terminate the deposit cycle before it is completed. As described earlier, resetting the shift-register sets flip-flop $FF_2$, which produces output signal $ST_o$ enabling the first-stage logical gate $G_1$ for the start of a new deposit cycle.

The first error logical gate $G_{13}$ detects the condition that any one of the sensors $S_2$–$S_5$ may be actuated while the circuit is in the first stage of the deposit cycle. It will be recalled, that the first stage is initiated by the depression of the "Deposit" key 8 and is terminated as soon as the fascia gate 4 is fully opened. If during this time the chute sensor $S_2$, the printer sensor $S_3$, the gates sensor $S_4$, or the jam sensor $S_5$, is in its actuated condition, a signal will be generated via OR-gate 21 and NAND-gate $G_{13}$ and fed via OR-gate 20 to the error flip-flop gates $G_{11}$, $G_{12}$ to error circuit 50.

A second error condition detected by the circuit of FIG. 5 is the elapse of a specified time period, in this case 1.25 seconds, while the circuit is still in the first stage of the deposit cycle. Thus, if the fascia gate 4 has been commanded to open by signal $E_1$ but does not reach its fully open condition, (as sensed by sensor $S_1$ terminating the first stage) after the elapse of 1.25 seconds (which may arise because of jamming of the fascia gate), an error signal is produced by logical gate $G_{14}$ via Or-gate $G_{20}$.

Logical gate $G_{15}$ in the error circuit of FIG. 5 detects a further error condition, namely the condition that chute sensor $S_2$ has not yet been actuated after 40 seconds have elapsed since the start of the second stage of the deposit cycle. It will be recalled from above that this second stage is initiated by the opening of the fascia gate 4 (detected by sensor $S_1$) to permit the insertion of the bank deposit envelope. If this has not been inserted within 40 seconds from the start of that stage, as detected by chute sensor $S_2$, and if the jam sensor $S_5$ indicates (true) that an envelope has jammed, a signal is produced to the error flip-flop via gates $G_{15}$ and $G_{20}$.

Logical gate $G_{16}$ detects the error condition that five seconds have elapsed since the start of the fourth stage of the deposit cycle and the cycle has not yet progressed to the fifth stage. It will be recalled that the fourth stage is initiated 1.25 seconds after the fascia gate has closed ($\bar{S}_1$), and is terminated by the start of movement of the printer 14 ($S_3$). Thus, if the printer does not start to move within 5 seconds of the time it was commanded to do so (by gate $G_4$) a signal is produced via gates $G_{17}$ and $G_{20}$ to the error flip-flop gates $G_{11}$, $G_{12}$.

Logical gate $G_{18}$ detects the error condition wherein the apparatus is in the sixth stage of the deposit cycle, 1.25 seconds have elapsed since the start of the sixth stage, and safe gate 6 is still in its normal closed condition. It will be recalled that the sixth stage is initiated by signal $E_6$ which is produced after the printer has returned to its normal condition ($\bar{S}_3$). At this time the safe gate 6 is commanded by logical gate $G_6$, and if it does not start to do so within the 1.25 seconds specified, a signal is produced via gates $G_{18}$ and $G_{20}$ to error flip-flop gates $G_{11}$, $G_{12}$.

Finally, logical gate $G_{19}$ detects the error condition wherein the apparatus is in the seventh stage of the deposit cycle, and either a period of 2.5 seconds has elapsed, or the chute sensor $S_2$ is still actuated, before the seventh stage is terminated and the system is reset to its initial condition. The seventh stage is initiated by signal $E_7$, which starts the safe gate to open, thereby permitting the envelope to fall into the safe 22. If the envelope does not fall into the safe within the specified timer period of 5 seconds, as detected by chute sensor $S_2$, an output signal is produced by gates $G_{21}$, $G_{19}$ and $G_{20}$ to error flip-flop gates $G_{11}$, $G_{12}$.

As pointed out earlier, an error signal from the error flip-flop gates $G_{11}$, $G_{12}$ caused by any of the foregoing conditions, will result in the immediate termination of the deposit cycle, and resetting the system to its starting condition.

The foregoing are merely some examples of error conditions. Many others could be included.

Summary of Operations

In the normal or starting condition of the apparatus, both the fascia gate 4 and the safe gate 6 at the inlet and outlet ends, respectively, of the chute 2 are closed, and printer 14 is in its normal, non-actuated condition, all as illustrated in FIG. 1. In addition, the "Make Deposit" display 24 is non-illuminated. In the shift-register circuit illustrated in FIG. 3, the stage-enabling input signal $ST_o$ to the first-stage logical gate $G_1$ is "true", whereas the other stage-enabling signals $ST_1$–$ST_7$ are "false". The event signals $E_1$–$E_8$ are all "false". Further, flip-flop $FF_2$ is in its set condition, and shift-register SR is in its reset condition. The apparatus is now ready for execution of the deposit cycle.

To initiate a deposit cycle, the user depresses Deposit key 8, which produces a "true" start command $E_1$ fed to the first-stage logical gate $G_1$. Other actions by the user, in addition to the depression of the Deposit key 8, such as the insertion of a machine-readable personal card issued to that particular user, may be permitted or required, but such other actions are not involved in the present invention and are therefore not described herein.

As soon as the user depresses the Deposit key 8, a signal is produced by logical gate $G_1$ to fascia gate actuator 10 opening the fascia gate 4, and to circuit 26 illuminating the "Make Deposit" display 24.

In addition, a "true" enabling signal $ST_1$ is applied to the second stage logical gate $G_2$.

The foregoing is accomplished in the sequential controller 30 illustrated in FIG. 3 by applying the output pulse from gate $G_1$ to the clocking circuit 41 including flip-flop $FF_3$, the latter producing a clocking pulse to shift-register SR which shifts the signal to the output line $ST_1$ so that the signal on the latter line now becomes "true". This signal also resets flip-flop $FF_2$ so that its output $ST_o$ now becomes "false", thereby disabling the Deposit key 8 from thereafter initiating another deposit cycle, until the present cycle is completed or terminated.

Thus, during the first stage of the deposit cycle, fascia gate 4 is actuated to open and the "Make Deposit" display 24 is illuminated.

As soon as the fascia gate has been completely opened, it actuates sensor $S_1$ which terminates the first stage of the deposit cycle and initiates the second stage. This is accomplished by logical gate $G_2$ which produces a clock pulse from flip-flop $FF_3$ of clocking circuit 41, the latter being applied to shift-register SR to shift its signal to output terminal $ST_2$. During this second stage, fascia gate 4 remains actuated and the "Make Deposit" display remains illuminated, and in addition, the output pulses on line $ST_2$ is applied to the third stage gate $G_3$ to enable that stage.

As soon as the fascia gate 4 opens during the first and second stages of the deposit cycle, the user may place the deposit envelope within chute 2, whereupon the envelope drops by gravity through the chute and actuates feeler arm 24 of jam sensor $S_5$ and then feeler arm 12 of chute sensor $S_2$. Since safe gate 6 is in its closed condition, the gate will prevent the envelope from falling into the safe 22, and therefore sensor $S_2$ will remain in its actuated condition.

As soon as chute sensor $S_2$ is actuated, a "true" signal $E_3$ is applied to logical gate $G_3$ which is effective to step shift-register SR one position so that its output $ST_3$ becomes "true". This signal is applied to fascia gate actuator 10 to close that gate and also to circuit 26 to extinguish the "Make Deposit" display, and in addition to logical gate $G_4$ to enable the fourth stage of the deposit cycle.

The fourth stage is not initiated until the lapse of 1.25 seconds, as determined by timer 34 in FIG. 2, to enable the fascia gate to completely close and the envelope to settle in the bottom of the chute. As soon as this period of time has elapsed, and assuming that the fascia gate has fully closed (as determined by the "false" signal $\bar{S}_1$ from fascia gate sensor $S_1$ applied via $G_9$ to gate $G_4$), the latter logical gate produces an output signal which steps shift-register one position so that its output line $ST_5$ now becomes "true".

The latter signal is applied to printer actuator 16 to actuate printer 14, whereupon the printer applies a transaction number to the envelope within the chute, and then returns to its normal position. The $ST_4$ signal also enables the fifth-stage gate $G_5$ which stage is initiated by sensor $S_3$ as soon as the printer is actuated.

When the printer returns to its normal condition as sensed by the "false" signal $\bar{S}_3$ from printer sensor $S_3$, the sixth stage is initiated by logical gate $G_6$ to shift the shift-register SR output to make its output line $ST_6$ "true". The latter signal is applied to the safe gate actuator 20 to open the gate, and is also applied to the seventh-stage logical gate $G_7$ to enable that gate.

The seventh stage is initiated 2.5 seconds thereafter to enable the safe gate to fully open. After the elapse of this time period, as determined by timer block 36, the seventh-stage logical gate $G_7$ steps shift-register SR so that its output line $ST_7$ now becomes "true". The latter signal is applied to safe gate actuator 20 to close the safe gate, and also to the eighth-stage logical gate $G_8$ to enable that gate for the eighth stage operation.

The eighth stage is initiated by safe gate sensor $S_4$ sensing the return of safe gate 20 to its normal closed position, whereupon logical gate $G_8$ shift-register SR to shift the signal to its output line $ST_8$. This signal is applied to the reset circuit 38 which resets shift-register SR and also places flip-flop $FF_2$ in its set condition, whereby its output terminal $ST_o$ is "true".

The deposit cycle is thus completed, and the circuit is enabled for the initiation of a new deposit cycle by the next user depressing Deposit key 8.

In the event there occurs, during any stage in the deposit cycle, an action or condition deviating from the predetermined sequence, or not within a time period specified in the sequence, the error flip-flop comprising the cross-connected error gates $G_{11}$, $G_{12}$ illustrated in FIG. 5 is set to produce an error signal output from error circuit 39. This error signal terminates the deposit cycle by actuating the resetting circuit 38 (FIG. 3) to the shift-register and causing flip-flop $FF_2$ to go to its set condition producing a "true" output $ST_o$. The various conditions which produce the error operation are implemented by logical gates $G_{13}$–$G_{19}$ of FIG. 5.

While the invention has been described particularly with reference to an apparatus enabling the deposit of bank envelopes in a tellerless manner, it will be appreciated that some or all of the features of the invention could advantageously be used in other applications.

Many variations, modifications, and other applications of the invention will therefore be apparent.

What is claimed is:

1. Apparatus for use in depositing articles, such as bank deposit envelopes, in a receptacle, comprising:
    a chute having an inlet through which the articles are inserted and an outlet through which the articles exit into the receptacle;
    a mechanical gate at the inlet of the chute;
    a mechanical gate at the outlet of the chute;
    an actuator for each of the inlet and outlet gates for opening and closing same;
    a recording device within the chute for recording information on the article therein;
    an actuator for actuating the recording device;
    cycle initiating means enabled when the inlet gate is closed for initiating a deposit cycle having a predetermined sequence of actions including opening the inlet gate to permit insertion of the article into the chute while the outlet gate is closed, closing the inlet gate, actuating the recording device to record information on the article, and opening the outlet gate to permit the article to pass into the receptacle;

a sequence controller controlling the actuators of the inlet gate, the recording device, and the outlet gate to enforce said predetermined sequence of actions in the deposit cycle within specified time periods;

and error detecting means terminating the deposit cycle at any stage thereof in which there occurs an action deviating from said predetermined sequence or not within a time period specified in the sequence.

2. Apparatus according to claim 1, wherein said sequence controller comprises:

means including a plurality of sensors sensing a plurality of events occurring asynchronously and producing actuating signals in response thereto;

and a sequencing circuit including means establishing a plurality of stages according to a predetermined sequence in which the events are to occur in the deposit cycle;

said sequencing circuit further including control means responsive to the sensor actuating signal in its respective stage for actuating the respective actuator and for advancing the sequential controller to the next stage of the deposit cycle.

3. Apparatus according to claim 2, wherein said means sensing the plurality of asynchronously occurring events comprises:

an inlet gate sensor sensing the condition of the inlet gate;

a chute sensor sensing the condition of whether or not an article is in the chute;

a printer sensor sensing the condition of the printer;

and an outlet gate sensor sensing the condition of the outlet gate.

4. Apparatus according to claim 2, wherein said sequencing circuit includes:

a shift register having an input and parallel outputs one for each stage;

a logical gate for each stage;

each logical gate producing a predetermined output signal upon receiving an enabling signal from the shift-register output of the preceding stage in coincidence with an actuating signal from the sensor of its respective stage;

means feeding a signal to the input of the shift-register;

clocking means responsive to said predetermined output signal from each of the logical gates for clocking the shift-register to shift its input signal from one output to the next in succession;

and means responsive to the output signals from the shift-register for controlling the actuators.

5. Apparatus according to claim 4, wherein:

said clocking means comprises a flip-flop receiving the output signals from all the logical gates at one of its input terminals, and the inversion thereof at the other of its input terminals;

means clocking the flip-flop;

and means feeding the signals from one output terminal of the flip-flop to the clock input of the shift-register for clocking same.

6. Apparatus according to claim 4, further including means connected to the last stage of the shift-register for resetting same.

7. Apparatus according to claim 1, wherein the cycle means is enabled when both the inlet and outlet mechanical gates are closed, the outlet mechanical gate being closed at the end of the deposit cycle.

8. Apparatus according to claim 1, wherein said error detecting means further includes a jam sensor sensing the jam of an article in the chute and terminating the deposit cycle in response thereto.

9. Apparatus for use in depositing articles, such as bank deposit envelopes, in a receptacle, comprising:

a chute having an inlet for receiving articles and an outlet for discharging said received articles into said receptacle;

actuatable recording means within said chute for recording information on articles received therein;

deposit cycle initiating means enabled when an article is received by said inlet for initiating a deposit cycle comprising a predetermined sequence of timed actions;

a sequence controller for controlling the performance of said predetermined sequence of timed actions in the deposit cycle within specified time intervals;

error detecting means for terminating the deposit cycle at any stage thereof when one of said predetermined sequence of timed actions is not performed within the time interval specified in the sequence, said error detecting means having a timer pulse generating means for associating a time interval for performing each action in said predetermined sequence; and means within said error detecting means for generating an error signal when an action in said predetermined sequence has not been performed within its associated time interval.

10. The apparatus of claim 9 wherein said sequence controller comprises:

a plurality of sensors for sensing a plurality of events occurring asynchronously and for producing actuating signals in response thereto; and a sequencing circuit including means establishing a plurality of stages according to a predetermined sequence in which the events are to occur in the deposit cycle, said sequencing circuit further including control means responsive to the sensor actuating signal in its respective stage for advancing the sequential controller to the next stage of the deposit cycle.

11. The apparatus of claim 10 wherein said means for generating an error signal comprises a plurality of logic gates wherein each one of said plurality of logic gates is associated with a respective one of said plurality of said sensors, each said logic gate receiving the actuating signal from its associated sensor and a time interval terminating pulse from said timer pulse generating means whereby said logic gates combine said received signals to determine if an action has been performed within its associated time interval.

* * * * *